(12) United States Patent
Kim et al.

(10) Patent No.: US 8,658,329 B2
(45) Date of Patent: Feb. 25, 2014

(54) ADVANCED MEMBRANE ELECTRODE ASSEMBLIES FOR FUEL CELLS

(75) Inventors: Yu Seung Kim, Los Alamos, NM (US); Byran S. Pivovar, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 51 days.

(21) Appl. No.: 13/528,457

(22) Filed: Jun. 20, 2012

(65) Prior Publication Data
US 2012/0308914 A1  Dec. 6, 2012

Related U.S. Application Data

(62) Division of application No. 11/113,678, filed on Apr. 22, 2005, now Pat. No. 8,227,147.

(51) Int. Cl.
*H01M 8/10* (2006.01)
*B01J 49/00* (2006.01)
*C08J 5/20* (2006.01)

(52) U.S. Cl.
USPC .............................. 429/483; 429/494; 521/27

(58) Field of Classification Search
USPC ......... 429/479, 482–483, 491–494, 507–508, 429/535; 521/27
See application file for complete search history.

(56) References Cited

U.S. PATENT DOCUMENTS

| | | | | |
|---|---|---|---|---|
| 6,130,175 A | * | 10/2000 | Rusch et al. | 442/77 |
| 2002/0091225 A1 | * | 7/2002 | McGrath et al. | 528/170 |
| 2006/0036064 A1 | * | 2/2006 | McGrath et al. | 528/373 |
| 2006/0166047 A1 | * | 7/2006 | Yoshimura et al. | 429/12 |

FOREIGN PATENT DOCUMENTS

| | | | | |
|---|---|---|---|---|
| WO | WO03067691 A2 | * | 8/2003 | H01M 8/02 |
| WO | WO03082956 A1 | * | 10/2003 | C08G 75/20 |
| WO | WO2004004037 A1 | * | 1/2004 | H01M 8/02 |

OTHER PUBLICATIONS

Hickner et al. (Hickner et al., Proceedings of the Symposium on Proton Conducting Membrane Fuel Cells III, 202nd meeting of the ECS, Salt Lake City, Utah, Oct. 20-24, 2002).*
Abstract in English of WO2004004037A1.*

* cited by examiner

*Primary Examiner* — Barbara Gilliam
*Assistant Examiner* — Claire L Roe

(57) ABSTRACT

A method of preparing advanced membrane electrode assemblies (MEA) for use in fuel cells. A base polymer is selected for a base membrane. An electrode composition is selected to optimize properties exhibited by the membrane electrode assembly based on the selection of the base polymer. A property-tuning coating layer composition is selected based on compatibility with the base polymer and the electrode composition. A solvent is selected based on the interaction of the solvent with the base polymer and the property-tuning coating layer composition. The MEA is assembled by preparing the base membrane and then applying the property-tuning coating layer to form a composite membrane. Finally, a catalyst is applied to the composite membrane.

3 Claims, 7 Drawing Sheets

ADVANCED MEMBRANE ELECTRODE ASSEMBLIES FOR FUEL CELLS

RELATED APPLICATIONS

This application is a divisional of U.S. patent application Ser. No. 11/113,678 entitled "Advanced Membrane Electrode Assemblies for Fuel Cells," filed Apr. 22, 2005, now allowed as U.S. Pat. No. 8,227,147, incorporated by reference.

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

The present invention relates generally to polymer electrolyte membrane fuel cells, and, more particularly, to a method for producing advanced membrane electrode assemblies exhibiting improved performance and durability.

BACKGROUND OF THE INVENTION

Current fuel cell membrane electrode assemblies (MEAs) suffer from incompatibilities between the materials used for membranes and electrodes, especially when non-traditional membranes (e.g., sulfonated polysulfone) are used with conventional Nafion®-bonded electrodes. These material property incompatibilities include differences in water uptake, electro-osmotic drag, and adhesion (chemical composition). The present invention method was the result of isolating the factors that affect performance and durability, and optimizing the method for producing advanced MEAs taking those factors into account. The present invention method produces MEAs that comprise multiple layers of polymer electrolytes that exhibit tunable properties leading to improved performance, properties, and durability under a wide range of fuel cell operating conditions, to include use in direct methanol and hydrogen fuel cells.

Polymer electrolyte membrane fuel cells (PEMFC) and direct methanol fuel cells (DMFC), a subset of PEMFC, have been the center of attention for over a decade as possible candidates for next generation energy conversion devices. PEMFC and DMFC are currently being developed for a number of different applications. Some of the most important challenges for PEMFC construction methods are to reduce the membrane cost, increase durability, increase the operating temperature range, and increase conductivity at low levels of relative humidity (RH). The main challenge concerning DMFCs is to reduce the methanol crossover from anode to cathode, while maintaining high conductivity. Methanol crossover adversely affects the cell by lowering the cell voltage due to a mixed potential effect at the cathode (lower power density and efficiency) and lowering fuel utilization (lower efficiency).

The current state of the art perfluorinated sulfonic acid proton exchange membrane, Nafion®, is not only costly but also has a tendency to creep (limiting its durability, especially at high temperature), poor conductivity under dry conditions, and inherently high methanol permeability. As a consequence, significant effort has been spent developing alternative hydrocarbon based proton exchange membranes, which are less expensive, have higher glass transition temperatures and lower methanol permeability. Issues involving conduction at low RH are also being extensively studied, but materials that have adequate conduction for most applications under these conditions have not been found. Still, the present invention fabrication method and techniques presented are applicable to such systems once materials with the requisite properties are developed.

Many polymers [McGrath, et. al, U.S. Patent Application No.20020091225, 2002, Koyama et. al, U.S. Pat. No. 6,670, 065, 2003, L. Jorissen, et. al. *J. Power Sources*, 105, 267, 2002, K. Miyatake, et. al. *Macromolecules*, 37, 4961, 2004] have been identified that have promising properties for use in fuel cell systems, however, use of membranes other than perfluorinated sulfonic acid polymers have shown little or no performance improvement in fuel cell testing. In other words, anticipated performance improvements based on membrane properties have not been realized in functioning devices. A primary barrier to the successful integration of alternative polymeric membranes into high performance membrane electrode assemblies is attributed to minimizing interfacial resistance loss and interfacial delamination between the membrane and the electrode under fuel cell operating conditions.

The present invention allows for the incorporation of alternative polymers in fuel cell systems, while maintaining robust, high performance membrane electrode assemblies, and improving long-term cell performance (power density and/or fuel efficiency) and durability.

Therefore, in accordance with the present invention, a membrane coating fabrication method and consequent fuel cell membrane have been developed to overcome performance degradation arising from interfacial resistance due to the dimensional mismatch between membrane and electrode materials. The present invention can be applied to direct methanol and hydrogen fuel cells using proton exchange membrane especially for situations where the chemical and/or water swelling differences between the electrode and membrane are dramatic.

Various objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a method of preparing advanced membrane electrode assemblies (MEA) for use in fuel cells. A base polymer is selected for a base membrane. An electrode composition is selected to optimize properties exhibited by the membrane electrode assembly based on the selection of the base polymer. A property-tuning coating layer composition is selected based on compatibility with the base polymer and the electrode composition. A solvent is selected based on the interaction of the solvent with the base polymer and the property-tuning coating layer composition. The MEA is assembled by preparing the base membrane and then applying the property-tuning coating layer to form a composite membrane. Finally, a catalyst is applied to the composite membrane.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION

The present invention includes a method for constructing membrane electrode assemblies (MEAs) for use in fuel cell applications. In various embodiments, materials in the construction of MEAs include wholly aromatic polymers based on biphenyl poly(arylene ether sulfone)s (BPSH). These copolymers, with moderate degree of disulfonation, have been tested extensively in fuel cells. [Pivovar et. al. The Electrochemical Society Meeting Abstract, vol. 2001-2, San Francisco, Calif., Sep. 2-7, 2001; Pivovar et. al., AIChE, Fuel Cell Technology: Opportunities and Challenges, Topical Conference Proceedings, New Orleans, La., Mar. 10-14, 2002; Hickner et. al., Proceedings of the Symposium on Proton Conducting Membrane Fuel Cells III, $202^{nd}$ meeting of the ECS, Salt Lake City, Utah, Oct. 20-24, 2002]

Prior work [J. Kerres, *J. New Mater. Electrochem. Syst.* 5, 2, 2002, Y. S. Kim et al. The Electrochemical Society Meeting Abstract, vol.2003-2, Orlando, Fla., Oct. 12-16, 2003] indicated that relative performance loss, decreasing current density with time at a fixed voltage, was caused by interfacial incompatibility between the hydrocarbon based membranes (for example, sulfonated polyetherether ketone or sulfonated polyether sulfone) and Nafion®-bonded electrodes. Furthermore, a prior report [Y. S. Kim et al. The Electrochemical Society Meeting Abstract, vol. 2004-1, San Antonio, Tex., May 9-14, 2004] states that higher interfacial resistance at the membrane/electrode interface is attributed to different water-swelling characteristics of the membrane and Nafion®-bonded electrodes. The difference in water swelling ratios generates mechanical stress at the membrane/electrode interface as a membrane-electrode assembly goes from the dry fabricated state to a hydrated state under fuel cell operating conditions. Generally, it is known in the art that traditional hydrocarbon-based copolymers exhibit higher water uptakes than perfluorinated Nafion® membranes having similar proton conductivity.

The core of a traditional PEMFC is referred to as a membrane-electrode assembly (MEA), and includes: an anode catalyst layer, a polymer electrolyte membrane (PEM), and a cathode catalyst layer. MEAs are typically prepared either by direct painting of catalyst ink onto a PEM or by hot pressing catalyst layers to the PEM.

Method of Preparation with Corresponding Example

The present invention involves composite membranes; either single sided or double sided, to include single or multiple layers for use in composite MEAs and a method of preparing such MEAs. In the embodiments of the invention presented here, single layer composites, both single sided and double sided were demonstrated.

Figure 1:
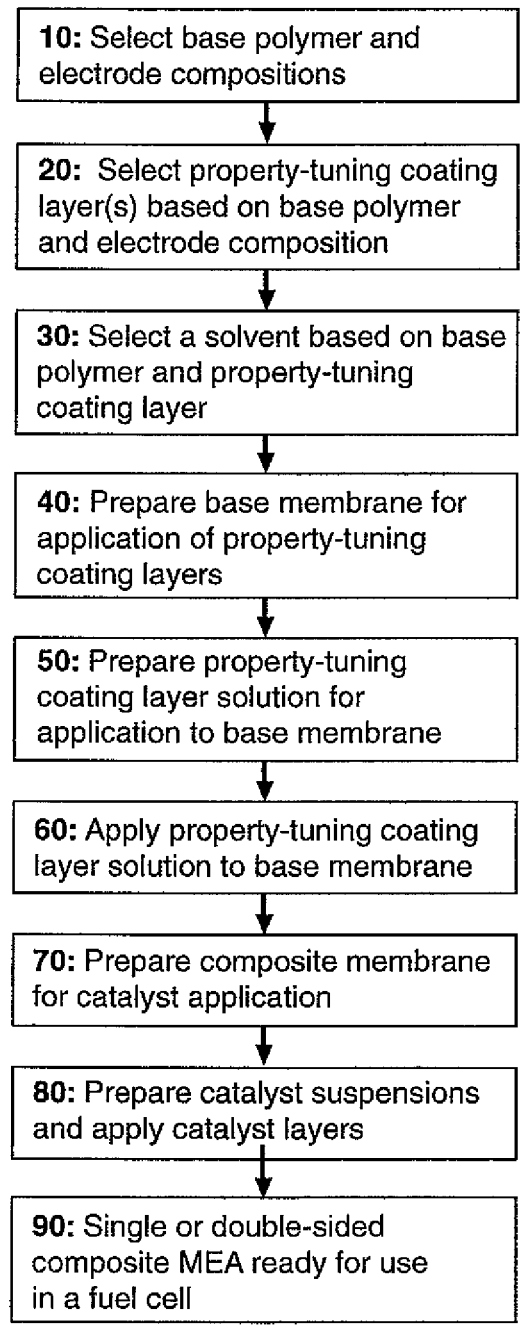
FIG. 1 is a flow chart describing the method of the present invention.

Referring now to FIG. 1, a flow chart of two embodiments (single and double sided) of a method of preparation for a novel composite membrane:

In Step 10, a base polymer is selected for a base membrane and an electrode composition is selected for an electrode. Both the base polymer and electrode composition are chosen based on desired properties of the resultant fuel cell MEA. For the base polymer, properties such as conductivity, permeability, electro-osmotic drag coefficient, cost, and thermal mechanical or chemical robustness are considered. The electrode composition is chosen primarily on electrochemical activity and cost, although other issues such as mass transport, ionic and electronic conductivity, catalyst loading and catalyst support composition are also considered. As evidenced by the present invention, the focus should be in choosing a polymeric material with optimized properties and matching it with electrodes with optimized properties. As for many conventional fuel cells, the best membrane materials are poorly matched with optimized electrodes.

The novel aspect of the present invention is the use of an intermediate layer(s) to improve adhesion and provide an ability to "tune" the physical property performance between membranes and electrodes of optimized composition. An exciting additional benefit is the ability to control the water content of a membrane under operating conditions by using materials with differing electro-osmotic drag coefficients as asymmetric composites. The novelty of this approach is based on choosing and applying coating layers to base polymer membranes. For one embodiment of the present invention, a wholly aromatic sulfonated polyarylene ether sulfone (BPSH -35—35% disulfonated, biphenyl sulfone for the monomers used in the polymerization) was chosen based on increased proton conductivity to methanol permeability ratio compared to Nafion® (Kim et. al, *J. Memb. Sci.*, 243, 317 (2004)). DMFC electrodes, containing Nafion® and either unsupported Pt or PtRu, were selected in this embodiment based on displayed optimized performance.

The choice for a base membrane material may be very broad, although specific classes of polymers such as those based on wholly aromatic or perfluorinated backbones, for stability, and containing strongly acidic entities (such as sulfonic acid), for conductivity are preferred. The choice of electrode materials is equally broad, although two common components are a catalyst and a proton-conducting polymer, such as Nafion®.

In Step 20, materials for the property-tuning coating layer(s) are chosen. The choice of material for a property-tuning coating layer(s) is based on compatibility with the base membrane and the electrodes. When considering multiple layer composites, compatibility with contacting layers is required, however consideration of contact with the base membrane and electrodes is not required. Compatibility in these systems is defined as the ability of the coating system to adhere to and maintain ionic conductivity between the coating layer and either the electrodes or base membrane, and includes contacting layers in the case of multilayer composites.

In Step 30, the choice of solvent is based on the interaction of the solvent with the property-tuning coating layer(s) material and the base membrane. Solvents, either single component or multi-component, are selected based on solubility characteristics with the coating polymer(s) and base membrane material. Ideally, solvents that allow full solubility of the selected polymers (coating and base materials) are employed. However, other solvents that either lead to significant swelling or to the formation of small particle size polymer dispersions might be practical if the result is robust polymer layers with good adhesion.

For one embodiment of the present invention demonstrated here, partially fluorinated polysulfone (6FCN -35 or 6F-30) copolymer was chosen as the property-tuning coating, because it is highly compatible with the high performance electrode material. Dimethyl acetamide (DMAc) was used because it is a known and preferred solvent for both the base membrane (BPSH-35) and the coating polymer (6FCN-35 or 6F-30).

In Step 40, the base membrane is prepared for application of property-tuning coating layers. The base membrane can be obtained commercially or by casting or extrusion from a polymer solution or melt. The preparation steps may include: treating with peroxide, de-ionized water and/or acid to remove impurities; swelling with appropriate solvents; or putting the membrane into or on an apparatus where coating layers can be applied.

In the example presented here, BPSH -35 in the sodium salt form was cast from a 5% (by weight) polymer solution of DMAc. This membrane was converted to the proton form by boiling in acid and boiled in deionized water three times to remove free acid. The hydrated membrane was then placed on a vacuum table (a porous metal plate, with vacuum pulled from the backside, and held at a constant controlled temperature, most often 75° C.). A mask was placed over the membrane that exposed the surface for coating, but sealed the vacuum being pulled by the porous plate. This system restrained expansion of the base membrane during coating and allowed accelerated removal of solvent from the coating solution as it was applied (Step 50).

In Step 50, a property-tuning coating layer solution is prepared using the appropriate polymer-solvent combinations determined in Step 20. Processing parameters of note include: stirring rate, time, temperature and pressure, concentration and filtration of the resultant polymer solution (or dispersion).

In the present embodiment, partially fluorinated polysulfone (either 6FCN-35 or 6F-30) copolymer was prepared by dissolving the polymer in DMAc (5% by weight) and filtering the dissolved solution through a syringe filter. A sub-step in preparation includes passing the 6FCN or 6F polymer solution through a 0.45-micron filter to remove undissolved polymer or salt impurity that could adversely affected the coating layers by reducing coating integrity or adhesion.

Next, in Step 60, the prepared property-tuning coating solution (or dispersion) is applied to the base membrane in order to form a single sided composite. The polymer may be applied by a number of methods such as painting, spraying, dip coating, slot coating, knife coating, spin coating or other coating techniques (some of which can allow for a double sided composite to be made in a single step, although this is not required). The conditions of the coating process, such as thickness of coats or time between coats for multiple coat process, temperature of system, inert gas flow rate over sample, etc. can play a role in determining the resultant composite membrane properties.

For the embodiment of the invention presented here, a hand painting technique was used for painting the coating solution onto one side of the base membrane on a vacuum table (conditions used were ~1 inch mercury absolute pressure and 80° C.). Six coats were applied to the membrane by a #2 camel hair brush, with approximately 1 minute intervals in-between each application. After the final coat, the composite was held at 80° C. on the vacuum table for at least 30 minutes to remove most of the DMAc by evaporation, resulting in a coating thickness approximately 10 microns thick. For the single sided 6F composites reported here, the composite membranes were complete with this single step. For the double-sided 6FCN composites, the composite membranes were cooled, removed from the vacuum table, and a coating layer was applied to the second side of the membrane following Steps 40, 50 and 60 to the second side of the base membrane. Note that multiple layer composites may be produced by repeating Steps 40, 50 and 60 with different polymer coating layers.

In Step 70, the composite membrane is prepared for application of catalyst layers. The preparation of composite membranes for MEA production may involve a number of steps known to those skilled in the art, such as acidification (if the membrane is in a salt rather than proton form), drying of the membrane, removing impurities from the membrane, solvent exchange, hydrating the membrane, and/or putting the membrane in an apparatus or process that allows catalyst layer attachment.

For the embodiment of the invention presented here, the completed composite membrane was removed from the vacuum table and placed in deionized water at room temperature for 12 hours to re-hydrate the membrane and any residual solvent. The composite was placed back on the vacuum table for application of the electrodes.

In Step 80, catalyst suspensions are prepared as commonly known to those skilled in the art and applied to the single or double sided composite. For symmetric membranes, the cathode and anode may be applied to either side of the membrane.

However, the orientation of single sided composites or asymmetric double-sided composites is important because of water transport issues. In polymer electrolyte fuel cells, protons travel through the polymer electrolyte (from the anode to the cathode) in order to complete the electrochemical reaction. Electro-osmotic drag, the transport of water due to the flow of protons, occurs in these materials and the extent of drag, the electro-osmotic drag coefficient or number of water molecules carried, depends on the material.

Therefore, when materials with different electro-osmotic drag coefficients are put into contact with each other, such as in the case of this invention, water can be preferentially held in or kept out of the membrane under operating conditions. Water in the membrane is important because hydration level impacts critical performance factors such as conductivity, permeability and mechanical properties.

In this embodiment of the present invention, the example composite membranes discussed here were placed on a vacuum table. A mask was placed over the membrane exposing only the coated surface for application of catalyst layers. The cathode ink was applied to one side of the composite; the membrane was cooled, removed from vacuum and flipped over. The vacuum was reapplied and the anode ink was applied.

Finally, in Step 90, the resultant MEA is assembled into a fuel cell.

Single sided composites or asymmetric double-sided composites may be utilized in order to dynamically control hydration or dehydration under fuel cell operating conditions. Double sided composites allow for the base membrane to provide the primary properties to the fuel cell electrolyte while coating layers provide better adhesion to the electrodes and therefore better performance and durability than the base membranes alone provide.

EXAMPLE

Two standard MEAs (non-composite MEAs for comparison purposes) were prepared, one using a Nafion® 1135 membrane (90 µm thick) and the other using a BPSH (sulfonated poly(arylene ether) sulfone) membrane (65 µm thick). Standard catalyst inks using unsupported platinum and platinum-ruthenium catalyst were applied to both using a direct painting technique. To prepare the catalyst ink mixtures, a 5% Nafion® dispersion (1100 equivalent weight made by Solution Technology, Inc.) was added to the water-wetted catalyst.

The anode ink composition was 86 wt % 1:1 platinum-ruthenium (made by Johnson Matthey, Plc.) and 14 wt % Nafion®, and the cathode ink composition was 90 wt % platinum black (Johnson Matthey, Plc.) and 10 wt % Nafion®. Catalyst inks were mixed by sonication for about 90 seconds and then directly transferred to a pre-dried membrane by direct painting at 75° C. The anode and cathode catalyst loading were approximately 10 and 6 mg/cm$^2$, respectively. Single and double side hydrophobic carbon cloths (made by E-TEK, Inc.) were used as anode and cathode gas diffusion layers, respectively. The two MEAs were then subjected to a test at 80° C. under DMFC operating conditions. (i.e., 0.5 M methanol feed at the anode, air flow at the cathode with humidification but without backpressure)

Figure 2A:
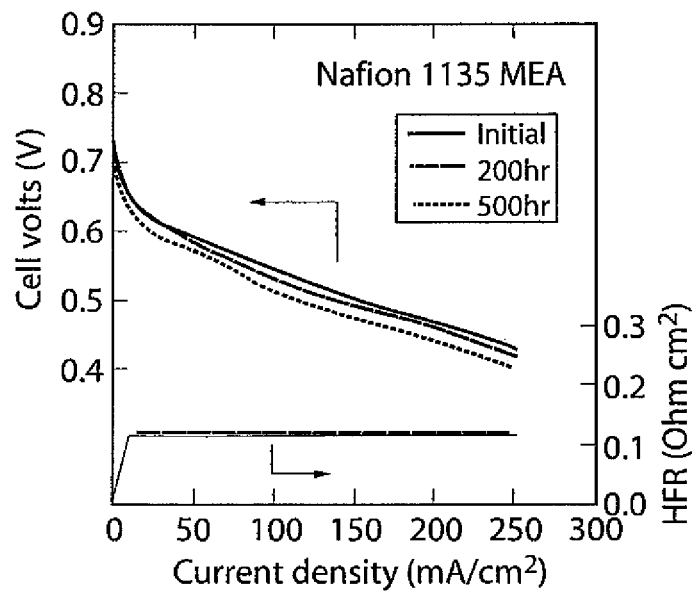
FIGS. 2a and 2b graphically depict comparative DMFC polarization curves using the Nafion® and biphenyl poly(arylene ether sulfone)s after 200 and 500 hour fuel cell operation.
Figure 2B:
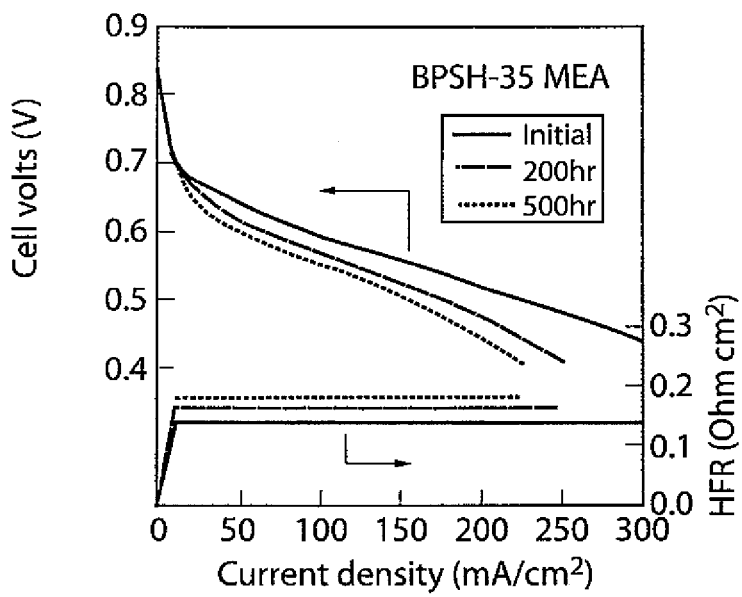

FIGS. 2a and 2b show the polarization curves of a Nafion® and a BPSH MEA at three points in time under DMFC operating conditions: initial performance, after 200 hours, and after 500 hours. The initial performance of the BPSH MEA was significantly superior to the performance of the Nafion® MEA, due to lower methanol crossover and comparable cell resistance. However, the BPSH MEA exhibited a greater decay in performance over time than the Nafion® MEA. After the 500 h life test, the current density losses for the BPSH and Nafion® MEAs were 70 and 35 mA/cm$^2$ at 0.5 V, respectively, resulting in comparable performance between the two MEAs after 500 hours.

In the case of the BPSH MEA, the greater drop in performance was accompanied by an increase in high frequency resistance, as opposed to the high frequency resistance of the Nafion® MEA that remained relatively constant over the 500 hour test. The performance loss and cell resistance increase for the BPSH MEA is attributed to interfacial resistance attributed to delamination between the electrodes and the membrane.

Figure 3A:
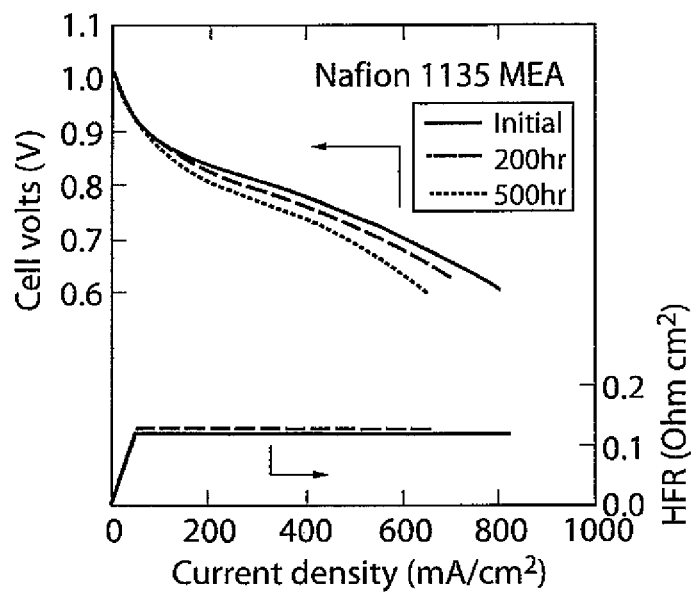
FIGS. 3a and 3b graphically depict comparative $H_2$/air polarization curves using the Nafion® and biphenyl poly(arylene ether sulfone)s after 200 and 500 hour fuel cell operation.
Figure 3B:
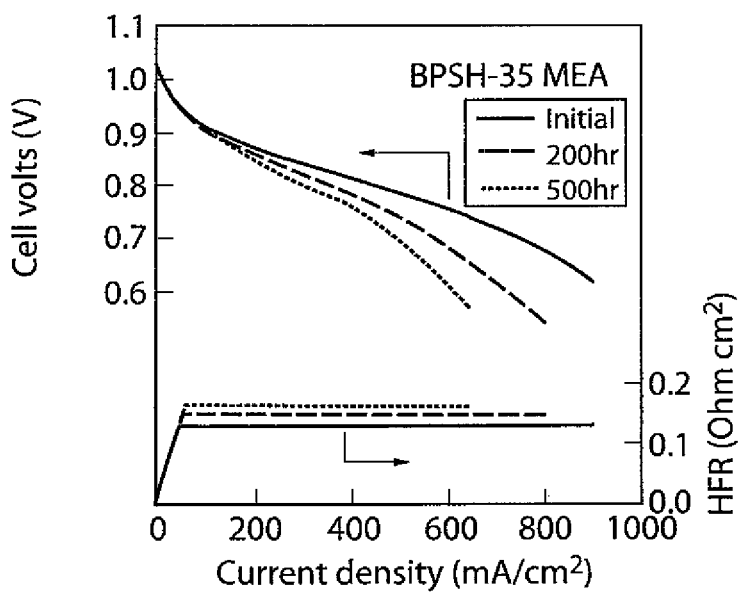

FIGS. 3a and 3b show the performance of the same two polymers in H$_2$/air fuel cells. Improved reaction kinetics and less reactant crossover result in increased efficiency and higher power output. However, trends in decreasing performance and increasing high frequency resistance (with the BPSH MEA) mirror the results of DMFC testing in FIGS. 2a and 2b, suggest that similar interfacial resistance phenomenon are at work regardless of whether hydrogen or methanol is used as the fuel.

Figure 4A:
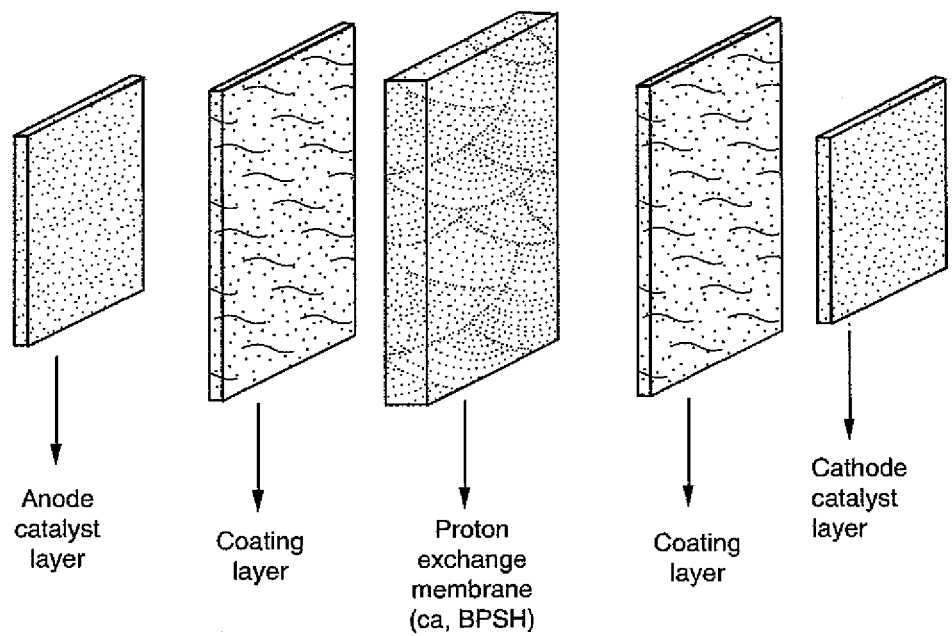
FIGS. 4a and 4b schematically depict the layout of a double sided and single sided MEA in accordance with the present invention, respectively.

The solution provided by the present invention is to reduce the role of interfacial phenomenon, thereby improving performance and durability. This is accomplished by employing a multi-component membrane system comprising multiple coating layers, such as that shown in FIGS. 4a and 4b. The role of coating layers in this form is to reduce the mechanical stress between the electrode layers and the proton exchange membrane, thereby improving interfacial compatibility and performance, and/or as a way to control hydration level under operating conditions.

In one embodiment of the present invention, BPSH with a 35% degree of disulfonation (BPSH-35) (65 µm thick) was used as the polymer electrolyte membrane and hexafluoro bisphenol A based poly(arylene ether benzonitrile) with a 35% degree of disulfonation (hereinafter 6FCN-35) was used as the coating material. Dimethylacetamide (hereinafter DMAc) was used as the co-solvent.

The 6FCN-35 copolymer was dissolved in DMAc (5 wt %) and coated onto each side of the dry BPSH membrane using a hand brush coating technique. The coated BPSH membrane was then dried on a vacuum table at 80° C. for 3 hours. The coating thickness of the 6FCN-35 layer was then measured using a micrometer. Each coating layer thickness was determined to be about 10 µm. The coated BPSH membrane was then immersed in deionized water at 25° C. for a minimum of 12 hours to remove the residual DMAc solvent. No delamination between membrane and coating layer was observed. The catalyst layers were applied by direct painting in the same manner as described previously for catalyst layer application on uncoated membranes.

Figure 5A:
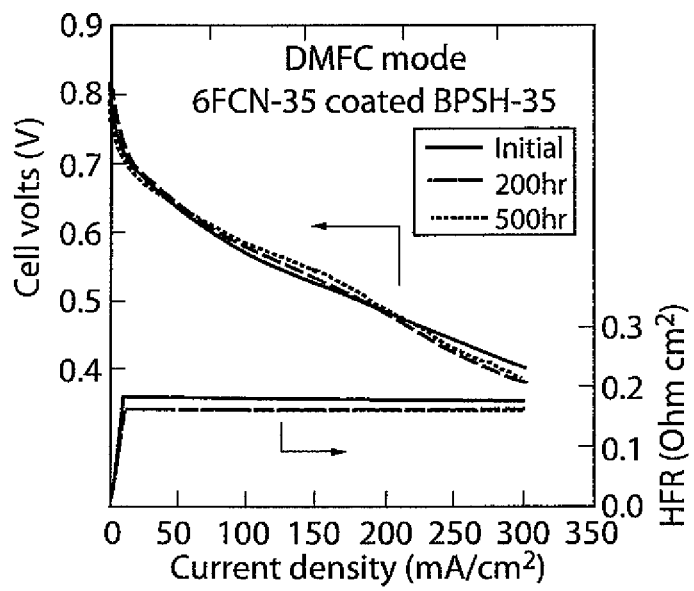
FIGS. 5a and 5b graphically depict the DMFC and $H_2$/air polarization curves of alternative hydrocarbon membrane before and after 200 and 500 hour fuel cell operation, respectively, in accordance with an embodiment of the present invention.
Figure 5B:
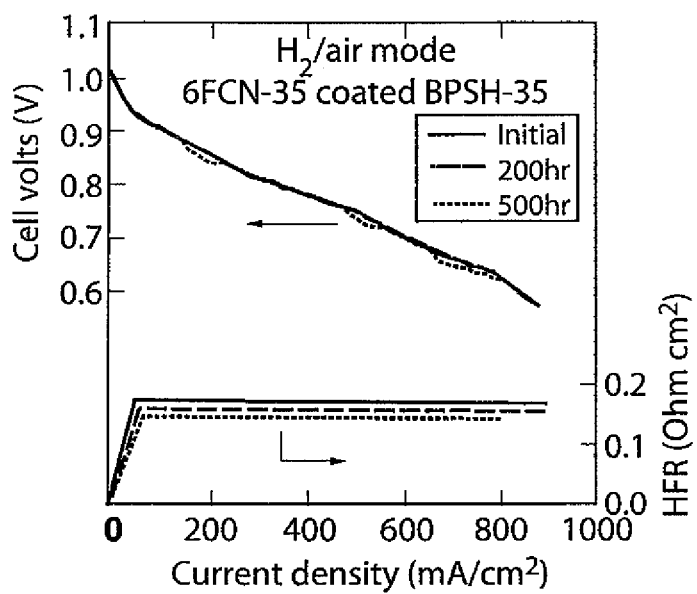

FIG. 5 shows the direct methanol and hydrogen fuel cell performance of a 6FCN-35 coated BPSH-35 MEA for the above embodiment of the invention. The performance of the 6FCN-35 coated BPSH-35 MEA is compared to an uncoated BPSH-35 MEA and a Nafion® MEA by comparing the results shown in FIG. 5 to the results in FIGS. 2a/2b and 3a/3b.

The results show that when compared to the uncoated system, the 6FCN-35 coated BPSH MEA has a slightly decreased initial performance, due to the additional resistance of the coating layers. The increased resistance of the coating layers is an artifact of the increased MEA thickness (~85 µm for the coated membrane vs ~65 µm for the uncoated membrane) and can be mitigated by using a thinner substrate or coating layers, thereby resulting in a system without increased resistance and having comparable performance to the uncoated system.

The observed long-term performance of these systems shows the benefits provided by the present invention. The long term performance of the coated system is stable, while that of the uncoated system is not stable, as witnessed by the changing polarization curves with time for the uncoated system (FIGS. 2a/2b and 3a/3b), compared to the stable response of the 6FCN-35 coated system (FIG. 5). The changing fuel cell resistances of these MEAs, also shown in FIGS. 2a/2b, 3a/3b, and 5, elucidate the long-term performance changes.

The uncoated BPSH-35 system (FIGS. 1 and 2) exhibits a significant increase in cell resistance over time, while the 6FCN-35 coated system (FIG. 5) exhibits a significant decrease in cell resistance over time. The increasing cell resistance over time in the uncoated system is attributed to poor interfacial adhesion and delamination of the membrane and electrodes over time. The decreasing cell resistance over time in the coated system is attributed to morphological changes in the polymer and to the effects of polymer hydration over time. A similar decrease was expected in the uncoated BPSH-35 system, suggesting that interfacial losses in this system are larger than decreases in resistance due to morphological changes and hydration. The stable performance and decreasing resistance of the coated 6FCN-35 system proves that losses in performance due to interfacial phenomenon are addressed by the present invention.

The benefits of hydrogen and methanol fuel cell performance for the 6FCN-35 coated system in FIG. 5 can also be interpreted in comparison to the results obtained for a traditional fuel cell material like Nafion® 1135, as shown in FIGS. 2a/2b and 3a/3b. While the membrane thicknesses of the two samples were nearly identical (~85 μm for the coated membrane vs ~90 μm for Nafion® 1135), the performance characteristics of Nafion® 1135 were more stable than the uncoated BPSH-35 membrane (also shown in FIGS. 1 and 2), which showed significantly faster degradation than the 6FCN-35 coated membrane shown in FIG. 5. Cell resistance of the Nafion® 1135 sample remained stable over time; thus, the membrane-electrode interface is relatively stable compared to the uncoated BPSH-35 system.

For DMFCs, the improved performance of the non-Nafion® based systems is reflected in the lower open circuit methanol crossover rates. The 6FCN-35 coated system (~85 μm) had the lowest crossover, at 33 mA/cm$^2$, the uncoated BPSH-35 sample (~65 μm) had a higher crossover, at 75 mA/cm$^2$, and the Neon® 1135 (~90 μm) sample exhibited the highest crossover, at 95mA/cm$^2$, for 0.5M methanol feed at 80° C. Methanol crossover in these systems adversely affects both fuel utilization and cell performance, thus, the lower the crossover rate, the better the performance.

The example above was chosen with regards to compatibility of the 6FCN-35 polymer with both the BPSH-35 base polymer and the electrode layers, and the properties of the base BPSH-35 material. An earlier study found that 6FCN-35 (hexafluoro bisphenol A based poly(arylene ether benzonitrile) with a 35% degree of disulfonation) exhibited interfacial compatibility with the electrodes [Y. S. Kim, M. J. Sumner, W. L. Harrison, J. S. Riffle, J. E. McGrath, B. S. Pivovar, *J. Electrochem. Soc,* 2004, 151, A2150]. It was also determined that BPSH-35 was a promising material for fuel cells, particularly direct methanol fuel cells, although issues of durability were a concern [Y. Kim et. al., Extended Abstracts of the 2004 Fuel Cell Seminar, San Antonio, Tex., Nov. 1-4, 2004]. The solubility of these copolymers in a common solvent (in this case DMAc) suggests good compatibility between the polymeric materials.

Although the above embodiment was prepared with DMAc, any solvent for either polymer that is known to form a polymer solution from which membranes with good mechanical properties may be used. The choice of solvent and processing conditions are important aspects of composite compatibility in MEAs. It is recognized that a wide variety of solvents or processing conditions (such as temperature, method of application, application of a restraint, application of a vacuum, etc.) may be used in applying a multilayer composite approach, and that these factors can play an important role in resultant properties. In the present invention, the removal of residual solvent was necessary to prevent contamination of the catalyst.

While the above described embodiment of the invention was produced by application of coating layers through hand brush coating, it is recognized that a variety of coating methods may be employed, such as dip coating, spin coating, spray coating, slot coating, and knife or doctor blade coating. It is also recognized that the present invention may be used for creating multiple coating layers that may be necessary or advantageous.

The improvement of interfacial compatibility is in part attributed to a decreased water uptake of the 6FCN-35 coating layer compared to BPSH-35 membrane, thereby more closely matching the volume change upon hydration of the Nafion® electrodes and leading to less mechanical stress at the electrode-membrane interface.

Another polymer, BPSH-30 (the same polymer backbone as BPSH-35 with a 30% disulfonation level rather than 35%), with lower water uptake was also investigated as a coating layer. Table I shows the results of testing a BPSH-35 membrane without a coating layer and with a coating layer of either BPSH-30 or 6FCN-35, prepared by using the method of the present invention. While the initial DMFC performance of the coated membrane systems at 0.5V is decreased for the coated systems, due to the increased resistance of the coating layers, the stability in performance of either system is much more stable over time. These results demonstrate that either coating layer presents an improvement in durability over an uncoated system, although thinner materials with lower overall resistance are necessary for attaining equivalent initial performance.

TABLE 1

Performance of Uncoated and Coated BPSH-35 MEAs

| Membrane | Coating layer | Duration of cell operation (hours) | Initial DMFC current density at 0.5 V [a] (mA/cm$^2$) | Current density at 0.5 V lost [a] (mA/cm$^2$) | Change in Cell resistance (mΩ cm$^2$) |
|---|---|---|---|---|---|
| BPSH-35 | None | 200 | 212 | 23 | 29 |
| | | 700 | | 68 | 53 |
| | BPSH-30 | 200 | 142 | 7 | 5 |
| | 6FCN-35 | 200 | 182 | 0 | −20 |
| | | 700 | | −2 | −28 |
| | | 2000 | | 6 | −30 |

[a] current density was measured from current-voltage polarization curve.
[b] cell resistance was measured from in-situ cell high frequency resistance response.

MEA Design and Implementation

The coated MEA systems discussed to this point have been symmetric and operated under conditions in which differences in properties of the individual components have played little role on performance, and have been presented for the manner they improve performance and durability. Composite membranes also allow the potential of tuning transport properties to produce composite materials that behave or function, in application, in ways that single component systems cannot.

For example, the use of composite membranes can retain water or prevent excessive hydration within the polymeric materials under operating conditions. These issues are relevant for conductivity at low relative humidity, an important concern for many fuel cell applications including high temperature operation (>80° C.), or for the potential utilization of materials that lack sufficient mechanical properties at high levels of hydration, but may be of interest for their transport properties such as high conductivity.

Figure 6A:
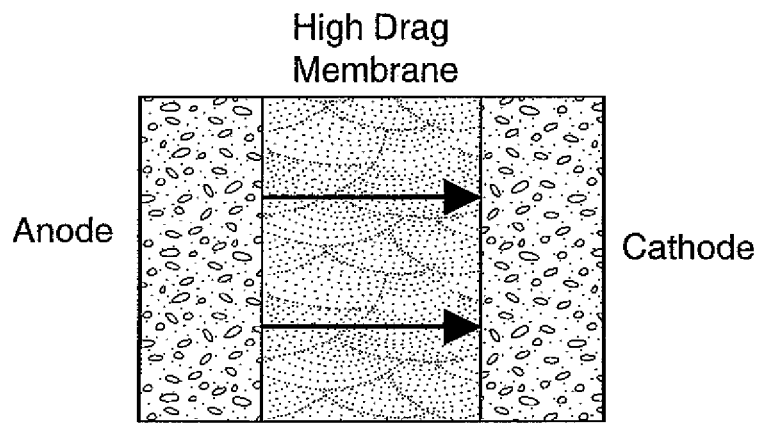
FIGS. 6a, 6b, and 6c pictorially illustrate how the present invention allows the ability to tune differing water movement characteristics within a subject MEA.
Figure 6B:
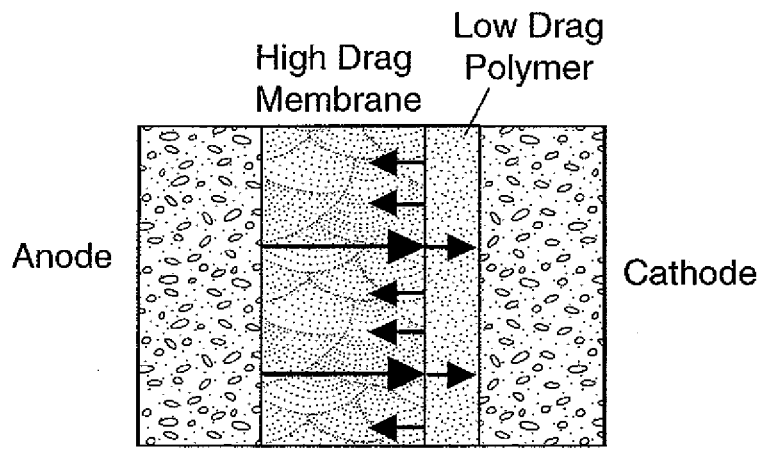
Figure 6C:
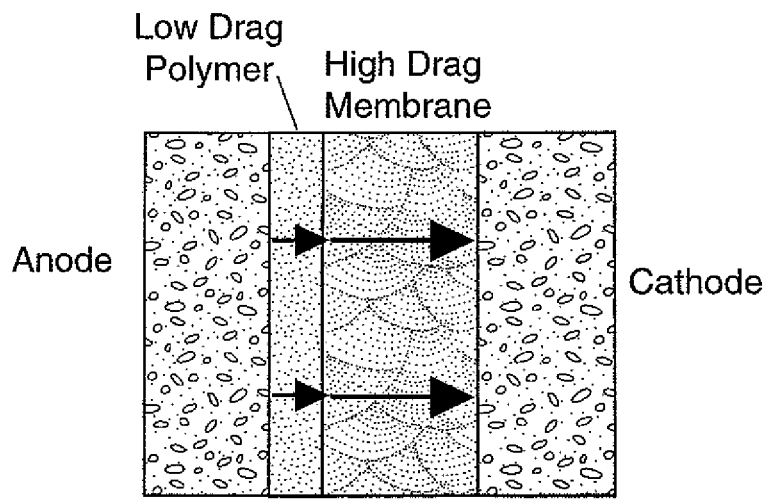

In polymer electrolyte fuel cells, protons travel through the polymer electrolyte (from the anode to the cathode) in order to complete the electrochemical reaction. Electro-osmotic drag, the transport of water due to the flow of protons, occurs in these materials and the extent of drag, the electro-osmotic drag coefficient or number of water molecules carried, depends on the material. Therefore, when materials with different electro-osmotic drag coefficients are put into contact with each other, such as in the case of this invention, water can be preferentially held in or kept out of the membrane under operating conditions. This is illustrated in FIGS. 6a, 6b, and 6c. FIG. 6a shows a traditional MEA where a high electro-osmotic drag membrane (e.g. Nafion®) was sandwiched with anode and cathode electrodes). FIGS. 6b and 6c show single sided composites where a low electro-osmotic drag material is used as a coating layer on a high electro-osmotic drag base membrane. In FIG. 6b, the low electro-osmotic drag material is on the cathode side of the cell, resulting in a situation where water carried from the anode, due to electro-osmosis, is held within the base membrane. This geometry is useful for fuel cells at elevated temperature (>100° C.) where membrane dehydration is an issue. In FIG. 6c, the low electro-osmotic drag material is on the anode side of the cell, resulting in a low hydration level in the base membrane because water is carried away from the interface faster than it can travel through the coating layer. This geometry is useful for fuel cells where mechanical properties of the base membrane are poor at high levels of hydration or where cathode flooding restricts fuel cell performance.

Water in the membrane is a critical issue in fuel cell performance, as the polymer electrolytes require water to conduct, however some materials like those of high ionic content can dissolve in the presence of too much water. Additionally, system implications such as energy losses due to humidification or airflow rates are highly dependent on the water balance within the system. The use of either symmetric or asymmetric composite membranes can enable improved properties and performance depending on operating conditions. The key is tuning factors such as the water diffusion coefficient or the electro-osmotic drag coefficient of the multiple layers employed so that water is retained or expelled under the operating conditions of the device.

Figure 4B:
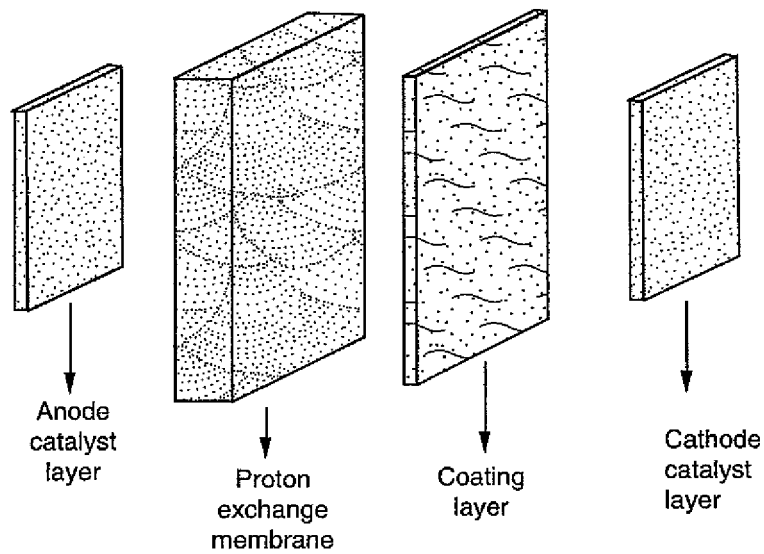

A single sided composite membrane is illustrated in FIG. 4b. Unlike the symmetric multilayer membrane shown in FIG. 4a, the asymmetric membrane has a coating layer on only a single side of the membrane and can be implemented in a fuel cell by placing the coated side of the membrane toward either the anode or cathode layer, although only the cathode orientation is shown in FIG. 4b. The orientation of single sided composites or asymmetric double-sided composites is important because of water transport issues.

Figure 7A:
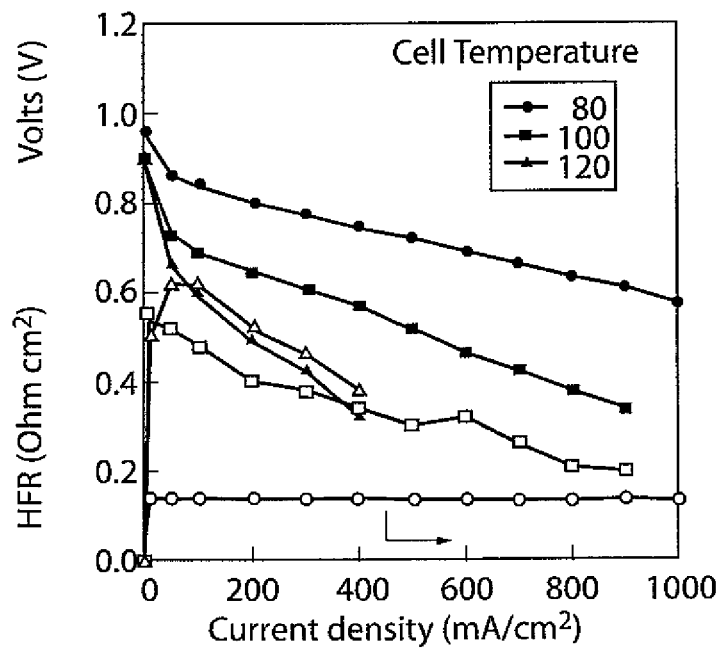
FIGS. 7a and 7b graphically depict fuel cell performance and high frequency resistance of a standard Nafion® MEA and a coated Nafion® MEA as a function of humidification levels and fuel cell operating temperatures, respectively, in accordance with an embodiment of the present invention.
Figure 7B:
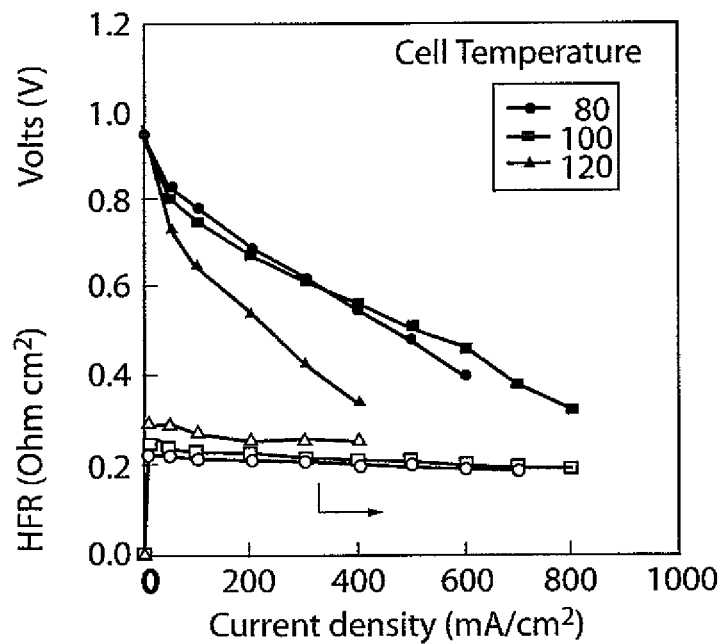

FIGS. 7a and 7b demonstrate an advantage of a single sided composite membrane compared to a single component membrane under low relative humidity (elevated temperature) operating conditions. In this embodiment of the invention, fluorinated poly(arylene ether sulfone) (6F-30) was used as the coating material for the cathode side of a Nafion® membrane. In this situation, the electro-osmotic drag coefficient for 6F-30 is 1.4 water molecules per proton, compared to 3.3 water molecules per proton for Nafion®. For the operating conditions investigated, the 6F-30 coated Nafion® cathode shows minimal performance loss with increasing cell temperature compared to a Nafion® MEA without the coating. The improved performance of the coated Nafion® under high temperature fuel cell operation is due to a better ability to maintain cell conductivity afforded by the water transport properties of the MEA and cell geometry. This is reflected in the high frequency resistance measurements shown in FIGS. 7a and 7b. The cell resistance for the coated Nafion® cathode increased only slightly with temperature, compared to the un-coated Nafion® control that showed a significant increase in resistance with increasing cell temperature (decreasing cathode relative humidity). Note that this was especially true at low current densities, where water generation at the cathode was small. This result shows the ability of the composite membrane system to maintain conductivity under conditions in which a single component membrane does not.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A polymer electrolyte membrane assembly, comprising,
    a. a base membrane to provide high proton conductivity, thermal stability, and low reactant permeability, said base membrane comprising a base polymer comprising disulfonated biphenyl poly(arylene ether sulfone),
    b. an electrode composition to provide electrochemical reactivity, reactant access, product removal, ionic and electronic conductivity, said electrode composition comprising a catalyst and a proton-conducting polymer, wherein the proton-conducting polymer is different than the base polymer; and
    c. a property-tuning coating layer composition connectively attached to said base membrane and said electrode to provide proton conductivity and material compatibility with said base membrane and said electrode, said property-tuning coating layer composition being selected from the group consisting of a disulfonated hexafluoro bisphenol A based poly(arylene ether benzonitrile) and a fluorinated poly(arylene ether sulfone).

2. The polymer electrolyte membrane assembly of claim 1, wherein said catalyst is selected from the group consisting of platinum, platinum-ruthenium, platinum black, and combinations thereof.

3. The polymer electrolyte membrane assembly of claim 1, wherein said disulfonated biphenyl poly(arylene ether sulfone) comprises a 35% degree of disulfonation.

* * * * *